April 25, 1961 A. O. PARKER 2,981,590
METHOD OF CONTROLLING TEMPERATURE IN REACTIVATING CATALYSTS
Filed Sept. 18, 1956

INVENTOR.
BY ALFRED O. PARKER
ATTORNEY

United States Patent Office 2,981,590
Patented Apr. 25, 1961

2,981,590

METHOD OF CONTROLLING TEMPERATURE IN REACTIVATING CATALYSTS

Alfred O. Parker, Bound Brook, N.J., assignor to American Cyanamid Company, New York, N.Y., a corporation of Maine Filed Sept. 18, 1956, Ser. No. 610,559

4 Claims. (Cl. 23—1)

This invention relates to an improved method of controlling temperature in tubular converters.

A large number of vapor phase catalytic reactions have been developed and one of the typical converter types used, especially where heat evolution is large, is a tubular converter in which the catalyst is in the tubes and cooling medium is circulated around the tubes. Where the evolution of heat is very great, it is customary to use liquid cooling baths, and with this type of converter no control problems are presented because of the enormous heat capacity of the liquid and the rapidity with which heat can be transferred from the tube walls to the liquid. However, liquid bath converters are very expensive and in some cases present maintenance difficulties and hazards, particularly with molten nitrite-nitrate baths. Therefore, wherever the vapor phase catalytic reactions have only moderate exotherm, cooling gases the used around the tubes and, in some cases, the reaction is so weakly exothermic that no cooling is needed and heating may even be necessary. However, many of these reactions with low exotherm result in contamination of the catalyst, usually with carbon or carbonaceous impurities.

Typical of this type of reactions are the production of diphenylamine by deamination of aniline, catalytic reduction of nitrobenzene with hydrogen, etc. After a certain period of time the catalyst becomes contaminated to the point where its efficiency drops, and it is necessary to regenerate it. This is normally done by passing hot air through the catalyst tubes, resulting in a burning out of the impurities. However, the regeneration produces a great deal of heat, often many times the evolution of heat in the reaction itself, and so a serious problem is presented in controlling the temperatures because excessive temperatures are apt to permanently injure the catalyst by sintering or other transformations.

It is possible to regenerate very slowly so that the heat is evolved over a sufficiently long period of time that the ordinary gaseous cooling is able to control it satisfactorily. This solution of the problem is in extensive practical operation. However, it presents some serious drawbacks. In the first place, if the regeneration time is excessively lengthened, the time during which the converter is not operating to produce product is increased and so the cost of operating the whole plant is markedly raised. Furthermore, with the relatively low cooling capacity of the cooling gases, particularly where gases which are inert, such as flue gases, are used which have low density and very low heat capacity, it is difficult to control sudden heat rises which may result in local portions of the converter. The protection against local overheating is also a factor in the operation of the converter to produce product if the reaction is moderately exothermic and if the converter is loaded as heavily as possible, which is, of course, economically desirable.

The present invention solves the problems presented by the gas cooled converter, permits rapid regeneration and permits complete and instantaneous control of local overheating. It therefore represents an improvement on the ordinary gas cooled tubular converter. In these converters it is quite common to have baffles so that that cooling gases are forced to take a sinuous path across the tubes and down through the converter. The present invention introduces steam, preferably automatically controlled, into the cooling flue gas as it enters and also introduces additional steam at varying points in the converter. The much greater heat capacity of steam, particularly wet steam, permits controlling exotherm at reaction or regeneration rates which would be impossible with ordinary gas cooling and, at the same time, can be locally directed so that any local overheating can be immediately corrected. Another advantage is that the converter is not complicated; the difficulties encountered with liquid bath converters are avoided, and the steam used for cooling is relatively a very cheap cooling medium.

In the above description of the problems faced by the prior art, the gases have been referred to as cooling gases. It should be understood that, particularly at the start of regeneration, it may be necessary to heat up the converter and so the cooling gases may initially be at a temperature sufficiently high to start operation. They are, however, lower in temperature than that which is actually produced in the catalyst tubes.

The invention will be described in greater detail in conjunction with the drawings in which.

Figure 1:
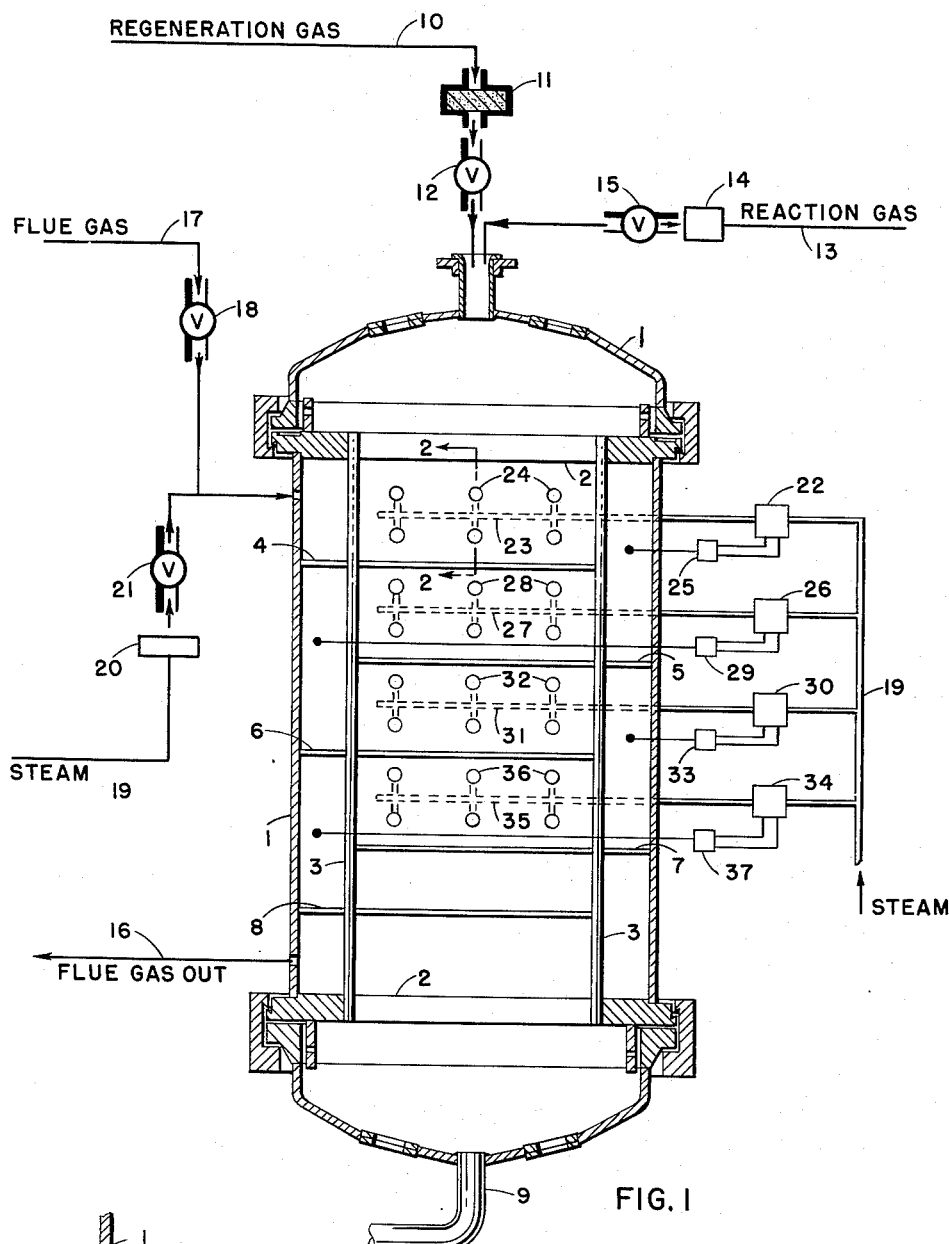
Fig. 1 is a semi-diagrammatic vertical section of a tubular converter.

The converter illustrated in Fig. 1 has a shell 1, tube sheets 2 and catalyst tubes 3. For sake of simplicity, the converter is shown in semi-diagrammatic form and only two tubes are shown. An actual converter, of course, has several hundred. The space around the catalyst tubes is divided into horizontal zones by the baffles 4, 5, 6, 7 and 8.

During catalyst regeneration, regeneration air at the proper temperature flows from the air header 10 through a controller 11 and valve 12 into the space at the top of the converter above the upper tube sheet. During operation of the converter to produce product, the upper space is similarly connected to a source of reaction gas 13 through a controller 14 and valve 15. The gas is passed downwardly through the tubes filled with catalyst, leaving the lower space of the converter below the lower tube sheet 2 through the outlet 9.

Figure 2:
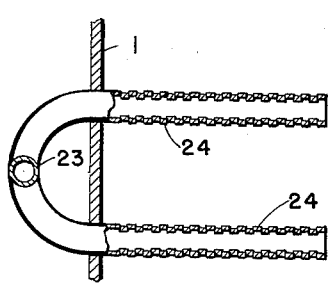
Fig. 2 is a detailed vertical section along the line 2—2 of Fig. 1.

Flue gas for cooling is introduced into the top section of the converter between baffle 4 and the upper tube sheet 2 from a flue gas line 17 through a valve 18. The flow of the flue gas is sinuous, passing across each stage down to the next, etc., and finally leaving the converter through an outlet 16. This flue gas circulation constitutes the main cooling circuit and, if the heat evolution is not too great, it may be the only cooling means. For excess cooling, there are provided steam mains 19 from which steam passes through the controller 20 and valve 21 into the flue gas inlet. From the other section of the main, steam can pass through the controllers 22, 26, 30 and 34 into the headers 23, 27, 31 and 35 which pass among the tubes and which connect to perforated sparging tubes 24, 28, 32 and 36. These tubes are run at right angles to the headers and are perforated, as is shown in the detail of a pair of sparging tubes 24 in Fig. 2. Control of the steam flow is effected by thermocouples 25, 29, 33 and 37 which, respectively, actuate the controllers 22, 26, 30 and 34.

The operation of the invention will be described in connection with the regeneration of contaminated catalyst in a process in which aniline is deaminated to diphenylamine. After the catalyst has become too contaminated for further satisfactory use, the valve 15 is closed. Regeneration air of proper temperature is supplied through the valve 12 which is opened. The regeneration air passes through the controller 11 and down through the tubes. Combustion starts in the first horizontal zone and the temperature rises rapidly. The valve 21 is opened so that steam in amounts controlled by the controller 20 mixes with the flue gas entering from the flue gas main 17. At the same time, as soon as the temperature in the top zone between baffle 4 and top tube sheet 2 reaches a predetermined point, the thermocouple 25 actuates the controller 22 and additional steam is sparged through the header 23 and the perforated sparging tubes 24, thus controlling the temperature in this first zone. As the combustion will not have gone further down the tubes at the start, the lower zones are relatively cool and no steam is sparged into them.

As the carbonaceous impurities burn out of the catalyst in the tubes in the top zone, the combustion zone gradually moves down the tubes and, as soon as the temperature in the second zone between baffles 4 and 5 reaches a predetermined point, the thermocouple 29 actuates the controller 26 and steam is sparged into this zone through the header 27 and perforated sparging tubes 28. Soon the combustion in the top zone ceases and the temperature in the top zone drops, whereupon the thermocouple 25 operates to reduce the flow of steam through the controller 22 and finally shuts it off altogether. In like manner, as the combustion zone gradually moves down the tubes, steam is sparged into the zones where the temperature exceeds the predetermined figure. As the combustion goes down the tubes, the heat evolved in any one zone becomes less because there is combustion below the main combustion zone. As a result the temperature rise is less and, in the lower zones, less steam has to be sparged in to maintain the temperature below the point set. In the last two zones between baffles 7 and 8 and between baffle 8 and the lower tube sheet 2 the heat evolution is sufficiently low so that no additional steam cooling is required locally, though the mixture of a certain amount of steam through the controller 20 may continue if the temperature in these lower zones is sufficiently high.

When the converter is operating to produce product, there will normally be much less rapid evolution of heat, and in most reactions it is possible to shut off the steam by valve 21 altogether. However, the system is protected because, if there should be a sudden local overheating in any one of the zones, steam will immediately be sparged in as a result of actuation of one or other of the controllers 22, 26, 30 and 34, and there is thus complete protection against any local overheating.

In the case of reactions which are more exothermic, it may be desirable to leave the valve 21 open and to permit a certain amount of steam to enter with the flue gases at all times. The system is completely flexible and maintains automatically the proper temperatures in the various zones, protecting completely against sudden temperature rises.

The process and apparatus described above is the preferred modification of the present invention in which control in the various zones is automatic. This is preferable in most cases. However, it is, of course, possible to have the thermocouples 25, 29, 33 and 37 register on instruments and control the steam sparging manually in accordance with the thermocouple reading. This results in a somewhat cheaper installation and, where the steam control is needed only occasionally, as in reactions where the exotherm of the reaction itself is insufficient to require any steam cooling and the cooling is needed only during periodic regenerations which may be at fairly long intervals, it may be economically preferable to use the less costly manual system. It is an advantage of the present invention that it is completely flexible and can be operated either automatically or manually.

The steam used is saturated steam and can be at a very low pressure as it is sparged into a flue gas cooling stream which is at atmospheric pressure or only slightly above. As a result the steam does not have to be under any considerable pressure and waste low pressure steam may be used from the exhausts of power turbines or heating equipment where the temperature is such that the steam must be maintained at a pressure in excess of atmospheric. The steam does not have to be dry. In fact, its cooling effect is markedly enhanced if it is somewhat wet. However, there are practical equipment limitations to the amount of water in the steam because, if the steam is too wet, controllers cannot operate satisfactorily. However, his is not a critical problem and the advantage of being able to use waste steam which may be quite wet is a very real one.

The sparging tubes are illustrated as perforated tubes. Any other shape, such as slotted tubes, which sparge relatively fine streams of stream may be used where desirable.

I claim:

1. In reactivating in situ a catalyst within the tubes of a gas-cooled, multitube, tubular converter, whereby (a) a highly exothermic reaction initially occurs within a limited portion of the catalyst near one end of said tubes, (b) said reaction then moves progressively along said tubes to the other end and (c) a flow of available cooling gas is maintained across said tubes, whereby the exothermic heat is removed while simultaneously heating said cooling gas; the improved method of both preventing excessive temperature rise in said limited catalyst portion and heating a limited flow of cooling gas to a desired exit temperature above that obtained when said cooling gas flow is sufficiently large to prevent an excessive temperature rise in said limited catalyst portion, said method comprising: passing said limited flow of cooling gas along a flow path in alternate directions through a succession of cooling zones, the flow in each zone being substantially normal to the longitudinal axis of said tubes; maintaining said limited flow at a rate such that said cooling gas is heated to said desired exit temperature; simultaneously introducing steam into said cooling gas flow, initially limiting said introduction of steam to substantially that length of the path of said cooling gas flow which is across that portion of the length of said tubes which contains said limited catalyst portion; maintaining the rate of steam introduction sufficiently high to prevent excessive temperature rise in said limited catalyst portion; then as said reaction progressively moves along said tubes, concurrently moving the length of path of said cooling gas flow into which steam is introduced successively through said cooling zones and limiting the introduction of steam to substantially only the length of path of said cooling gas flow which is across that portion of said tubes in which said reaction is occurring.

2. A process according to claim 1 in which controlled additional amounts of steam are also introduced into other portions of said path of flow through said cooling zones.

3. A process according to claim 1 in which controlled amounts of steam are introduced into the cooling gas before it enters the converter.

4. A process according to claim 1 for controlling the temperature of a regeneration cycle in conducting a catalytic reaction in said converter, said tubes containing catalyst mass and in which said reaction is caused by regeneration air passes through said tubes, whereby a combustion zone is produced therein, and said combustion zone gradually moves from one end of the converter to the other.

References Cited in the file of this patent

UNITED STATES PATENTS

| | | |
|---|---|---|
| 1,900,857 | Berry | Mar. 7, 1933 |
| 2,121,198 | Jenkins | June 21, 1938 |
| 2,320,562 | Bransky | June 1, 1943 |
| 2,338,861 | Thomas | June 11, 1944 |
| 2,384,858 | Thayer | Sept. 18, 1945 |
| 2,406,908 | Schideler | Sept. 3, 1946 |
| 2,645,566 | Stookey | July 14, 1953 |
| 2,666,692 | Dolezal | Jan. 19, 1954 |